(12) United States Patent  
Lewis

(10) Patent No.: US 8,410,921 B1  
(45) Date of Patent: Apr. 2, 2013

(54) VEHICLE GATE STATUS INDICATOR

(76) Inventor: Vern Lewis, Ironton, MN (US)

( * ) Notice: Subject to any disclaimer, the term of this patent is extended or adjusted under 35 U.S.C. 154(b) by 433 days.

(21) Appl. No.: 12/719,555

(22) Filed: Mar. 8, 2010

Related U.S. Application Data

(60) Provisional application No. 61/209,347, filed on Mar. 6, 2009.

(51) Int. Cl.  
*B60Q 1/00* (2006.01)

(52) U.S. Cl. ...................................................... 340/457

(58) Field of Classification Search .................. 340/457, 340/426.24, 426.25, 426.29, 687, 438, 545.1, 340/426.28; 180/286; 116/28 R  
See application file for complete search history.

(56) References Cited

U.S. PATENT DOCUMENTS

| | | | |
|---|---|---|---|
| 5,602,526 A | 2/1997 | Read | |
| 5,713,621 A * | 2/1998 | Krenkel et al. | 296/186.4 |
| 6,065,423 A | 5/2000 | Hensel | |
| 6,137,419 A * | 10/2000 | Lennox et al. | 340/687 |
| 6,727,806 B1 * | 4/2004 | Massie et al. | 340/426.24 |
| 7,000,563 B2 | 2/2006 | Hensel | |
| 7,088,045 B1 * | 8/2006 | Zich | 315/84 |
| 7,128,019 B2 | 10/2006 | Hensel | |
| 7,400,971 B2 * | 7/2008 | Robertson | 340/426.24 |
| 7,466,217 B1 * | 12/2008 | Johnson et al. | 340/425.5 |
| 7,834,750 B1 * | 11/2010 | Hertz et al. | 340/468 |

* cited by examiner

*Primary Examiner* — Phung Nguyen  
(74) *Attorney, Agent, or Firm* — Montgomery Patent & Design LLC; Robert C. Montgomery

(57) ABSTRACT

A wireless device that provides a visual indication to an operator of a pick-up truck sitting in the driver's seat that a tailgate is deployed or unsecured if in a lowered position is herein disclosed. A sensor is installed on the tailgate which will send a wireless signal to an indicator light mounted on a user selected area of the dashboard. Such a system will provide safety and protect the truck from potential damage to its tailgate and bed.

16 Claims, 8 Drawing Sheets

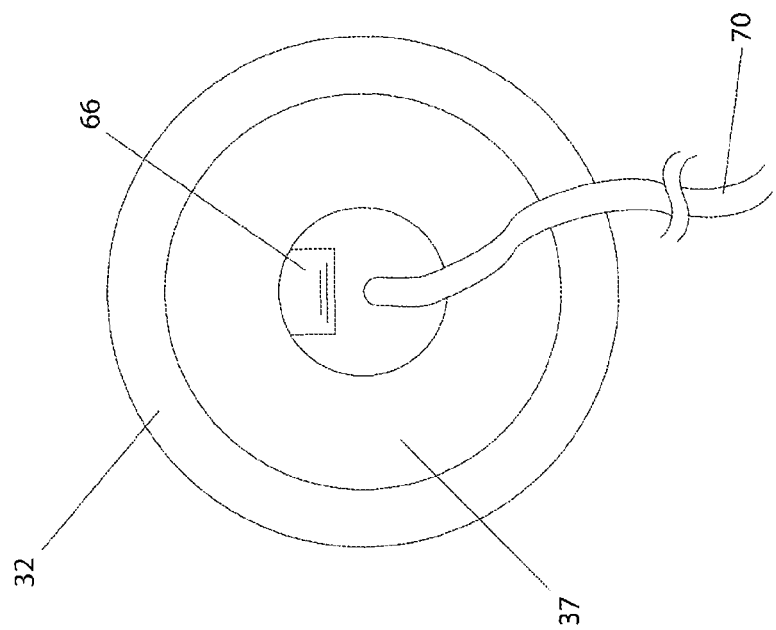
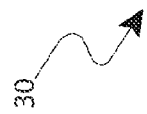
Fig. 6

VEHICLE GATE STATUS INDICATOR

RELATED APPLICATIONS

The present invention was first described in and claims the benefit of U.S. Provisional Application No. 61/209,347 filed Mar. 6, 2009, the entire disclosures of which are incorporated herein by reference.

FIELD OF THE INVENTION

The present invention relates generally to tailgates of motor vehicles such as pickup trucks, and in particular, to a warning light which provides an indicating means as to the status of such a tailgate.

BACKGROUND OF THE INVENTION

Pickup trucks and similar motor vehicles provide enhanced features as compared to other motor vehicles primarily based upon their size and upon features such as truck beds which are particularly adapted for the moving and hauling of large amounts of materials. One (1) problem associated with such truck beds is that it can be difficult to determine the position of the tailgate from the interior of the vehicle. In general, the tailgate is located far from the interior portion and is low down, making visibility difficulty. In situations where the bed of the truck is being used, it is often impossible to directly view the back of the truck from the interior while driving.

Various attempts have been made to provide visual tailgate status indicators for pickup trucks and the like. Examples of these attempts can be seen by reference to several U.S. patents. U.S. Pat. No. 5,602,526, issued in the name of Read, describes a vehicle open door warning system which provides an illuminating indicator of door status for large trucks. The Read apparatus is designed to be easily visible through a side view minor from a vehicle's interior.

U.S. Pat. No. 6,137,419, issued in the name of Lennox et al., describes a pickup truck tailgate monitor which utilizes a push-button type switch and circuit to indicate via visual means whether a tailgate is in an open or closed position.

U.S. Pat. No. 7,000,563, issued in the name of Hensel, describes a tailgate position indicator which provides a simple mechanical visual indicator of tailgate position, visible through a side view minor from the interior of a vehicle.

While these apparatuses fulfill their respective, particular objectives, each of these references suffer from one (1) or more of the aforementioned disadvantages. Many such apparatuses do not provide an indicator which is located within the interior of a vehicle. Also, many such apparatuses do not provide a means of simple retrofit to an existing vehicle. Furthermore, many such apparatuses do not provide variable powering means according to a user's needs. In addition, many such apparatuses cannot be mounted in a plurality of locations according to a user's preference. Accordingly, there exists a need for a tailgate status indicator without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a tailgate status indicator which is easily retrofitted and which is mountable in a desired location where the status of the tailgate is prominent, such that a user need not constantly monitor the apparatus. Thus, the object of the present invention is to solve the aforementioned disadvantages and provide for this need.

To achieve the above objectives, it is an object of the present invention to provide a visual indicator for determining the positional state of a tailgate while the operator is seated in the driver's seat. The system comprises an exterior indicator, an interior indicator, and associated electrical and electronic components.

Another object of the wireless exterior indicator is to comprise an outer surface device which determines whether or not a tailgate is deployed. The exterior indicator comprises a "T"-shaped housing, which further comprises a pair of mounting brackets.

Yet still another object of each mounting bracket is to comprise a conventional fastening means, such as self-tapping screws, adhesives, or the like, for securing the housing to a truck bed in a desired location.

Yet still another object of the present invention is to further comprise the exterior housing of a sensor which provides a wireless signaling means to an interior indicator to indicate the position of the tailgate. In a preferred embodiment, the sensor comprises a common single-pole momentary switch.

Yet still another object of the present invention is to further comprise the exterior housing of a first battery and a transmitter. The battery comprises a conventional replaceable battery which provides electrical power to the sensor and transmitter. The transmitter comprises a conventional transmitter which transmits an RF signal to a corresponding receiver located within the interior indicator.

Yet still another object of the present invention is to comprise a dome-shaped interior indicator which is mounted and secured to a desired portion of a dashboard of a pickup truck to provide an illuminating warning signal to an operator to inform them of an open tailgate.

Yet still another object of the present invention is to provide a plurality of mounting options. In one (1) embodiment, the interior indicator comprises wiring which connects the interior indicator to an existing accessory fuse box of a vehicle, and the indicator is integrally mounted on the dashboard by means of an integral threaded receiver. In another embodiment, the interior indicator is mounted to a desired location on a dashboard by means of a conventional fastener and mounting apertures and powered by a replaceable second battery.

Yet still another object of the present invention is to comprise a lamp and cover which are secured to the mounting means by means of the threaded receiver. The cover comprises indicia warning the user that a tailgate is in an opened position.

Yet still another object of the interior indicator is to comprise a receiver corresponding to the transmitter of the exterior indicator. When the transmitter is actuated, the receiver provides voltage to the lamp, thereby illuminating the cover and warning a user that the tailgate is in an opened position.

Yet still another object of the present invention is to provide a method of utilizing the device that provides a unique means of installing the exterior indicator in an appropriate location, installing the interior indicator in a desired location and in a desired manner, providing power to the indicators, and notifying a driver of the position of the tailgate in a simple and readily viewable manner.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6 is a rear view of the interior indicator 30, according to a preferred embodiment of the present invention;

DESCRIPTIVE KEY

Figure 1:
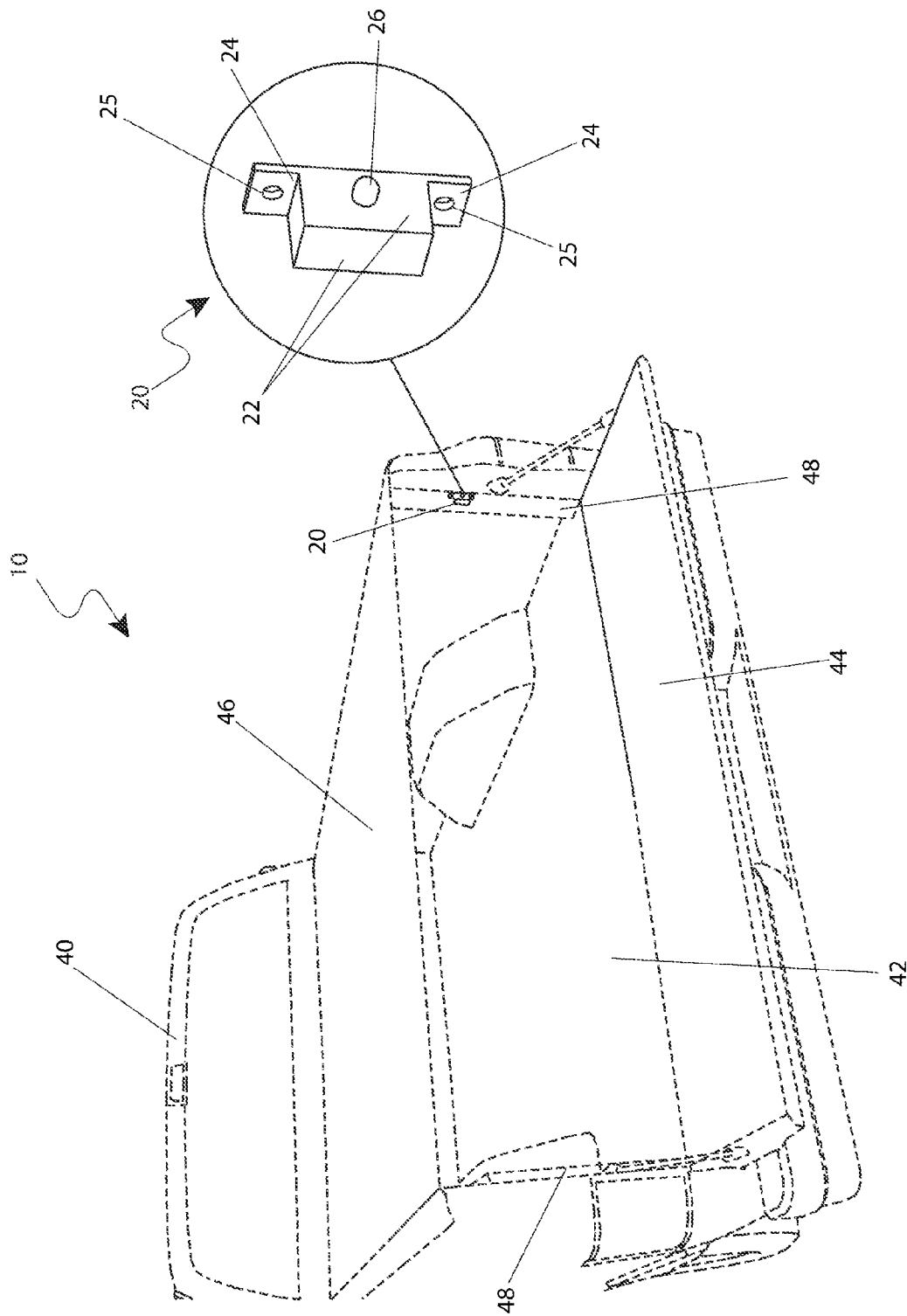
FIG. 1 is an environmental view of a tailgate status indicator 10 depicting an exterior indicator 20, according to a preferred embodiment of the present invention.

| | |
|---|---|
| 10 | tailgate status indicator |
| 20 | exterior indicator |
| 22 | exterior housing |
| 24 | mounting bracket |
| 25 | aperture |
| 26 | sensor |
| 30 | interior indicator |
| 31 | cover |
| 32 | interior housing |
| 34 | lamp |
| 36 | indicia |
| 37 | threaded portion |
| 38 | alternate mount |
| 39a | mount threaded portion |
| 39b | mount aperture |
| 40 | pickup truck |
| 42 | truck bed |
| 44 | tailgate |
| 46 | truck bed cover |
| 48 | tailgate jamb |
| 49 | fastener |
| 50 | dashboard |
| 60 | first battery |
| 61 | first battery compartment |
| 62 | first battery platform |
| 65 | second battery |
| 66 | second battery compartment |
| 70 | electrical wiring |
| 79 | transmitter |
| 80 | RF signal |
| 90 | receiver |

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a tailgate status indicator (herein described as the "system") 10, which provides a visual indicator for determining the positional state of a tailgate 44 thereon vehicles such as, but not limited to: pickup trucks 40, tractor trailers, or the like while the operator is seated in the driver's seat. The system 10 is especially helpful to operators of pickup trucks 40 therewith an affixed truck bed cover 46 that which limits the view of the position of the tailgate 44. The system 10 comprises an exterior indicator 20, an interior indicator 30, and associated electrical and electronic components. This retrofit system 10 illuminates the interior indicator 30 when the tailgate 44 is in a downward deployed position, thereby eliminating the misplacement of stored items therefrom the truck bed 42 as a result of driving therewith the tailgate 44 in said deployed position.

Referring now to FIG. 1, an environmental view of the system 10 depicting an exterior placement, according to the preferred embodiment of the present invention, is disclosed. The system 10 comprises a wireless exterior indicator 20, thereby providing the operator with an outer surface device that which determines whether or not the tailgate 44 is deployed. The exterior indicator 20 comprises a "T"-shaped exterior housing 22, thereby providing a secured enclosure and mounting means for the exterior components of the system 10. The housing 22 comprises a pair of mounting brackets 24 to secure the exterior sensor 20 to a vertical portion thereon the truck bed 42 perpendicular to the tailgate jamb 48. The exterior housing 22 is fabricated from materials such as, but not limited to: metal, plastic, or the like.

Figure 2:
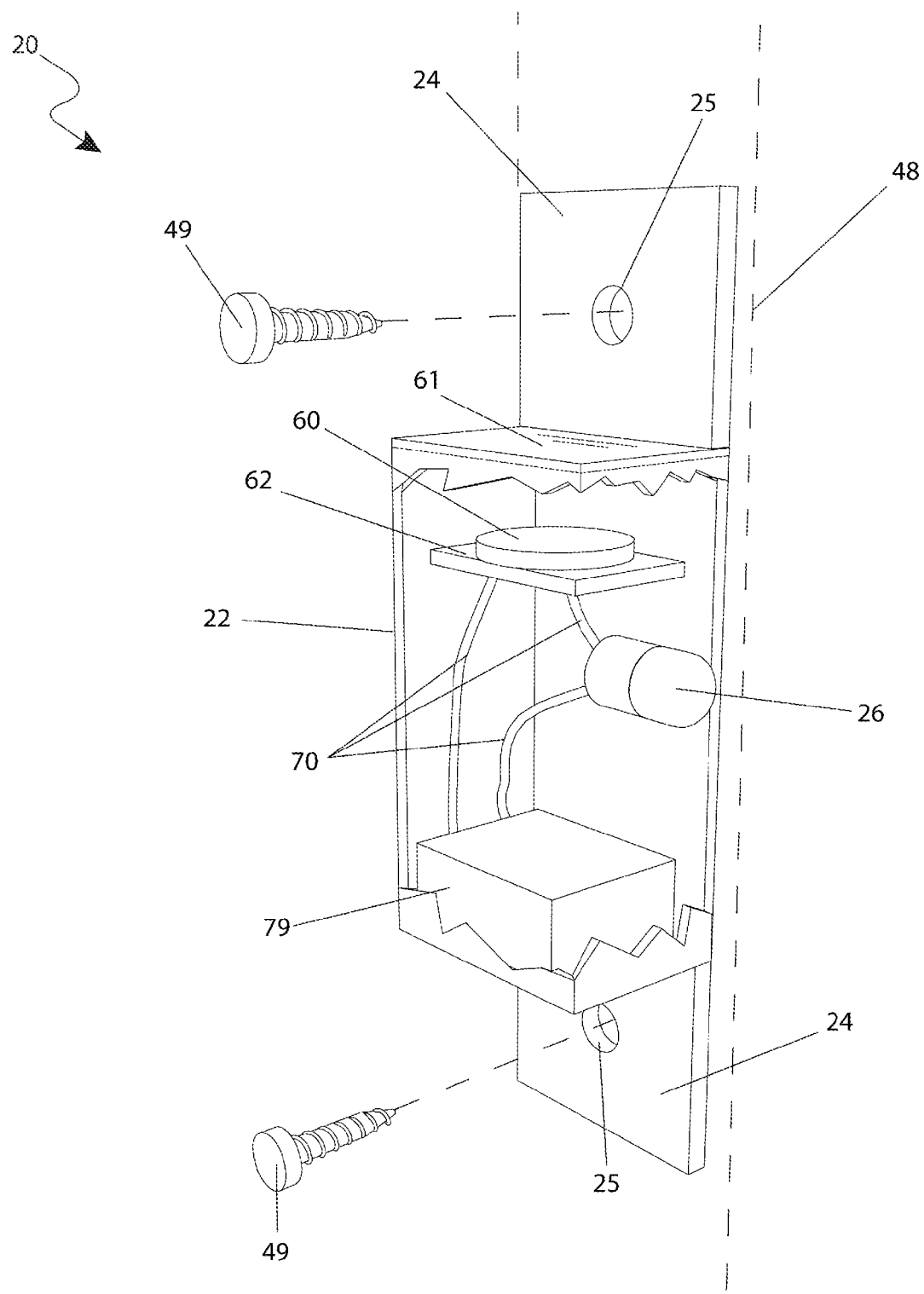
FIG. 2 is a perspective view of the exterior indicator 20, according to a preferred embodiment of the present invention.
Figure 3:
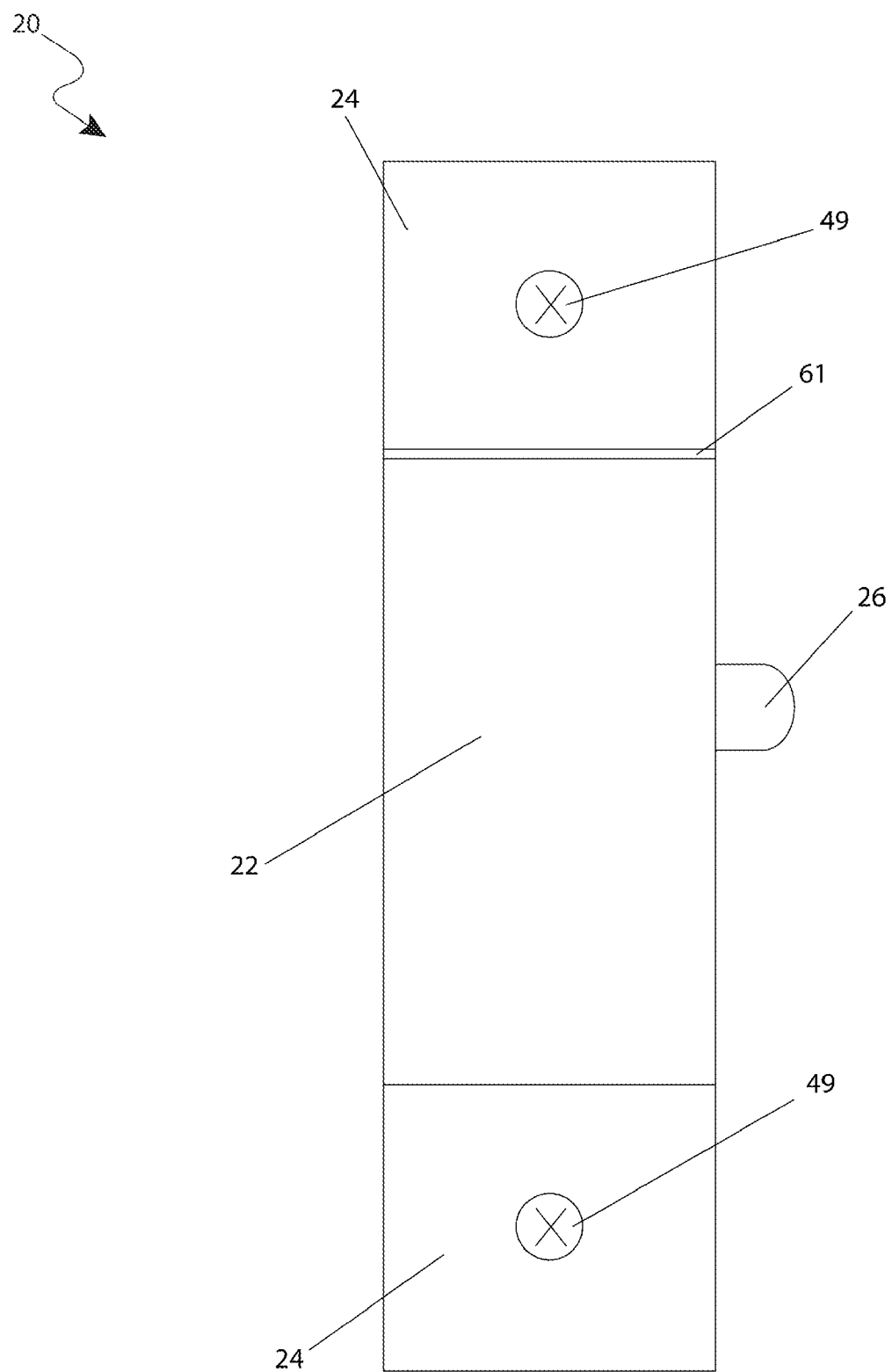
FIG. 3 is a front view of the exterior indicator 20 according to a preferred embodiment of the present invention.

Referring now to FIG. 2, a perspective view of the exterior housing 22 and FIG. 3, a front view of the exterior housing 22, according to the preferred embodiment of the present invention, are disclosed. Each mounting bracket 24 on the exterior housing 22 comprises an aperture 25 located at an intermediate position, thereby enabling a fastener 49 to be inserted in each said aperture 25 and secured to the truck bed 42 in a desired location. The fasteners 49 are preferably self-tapping screws, although other securing methods may be incorporated such as, but not limited to: adhesives, welding, or the like.

Figure 4:
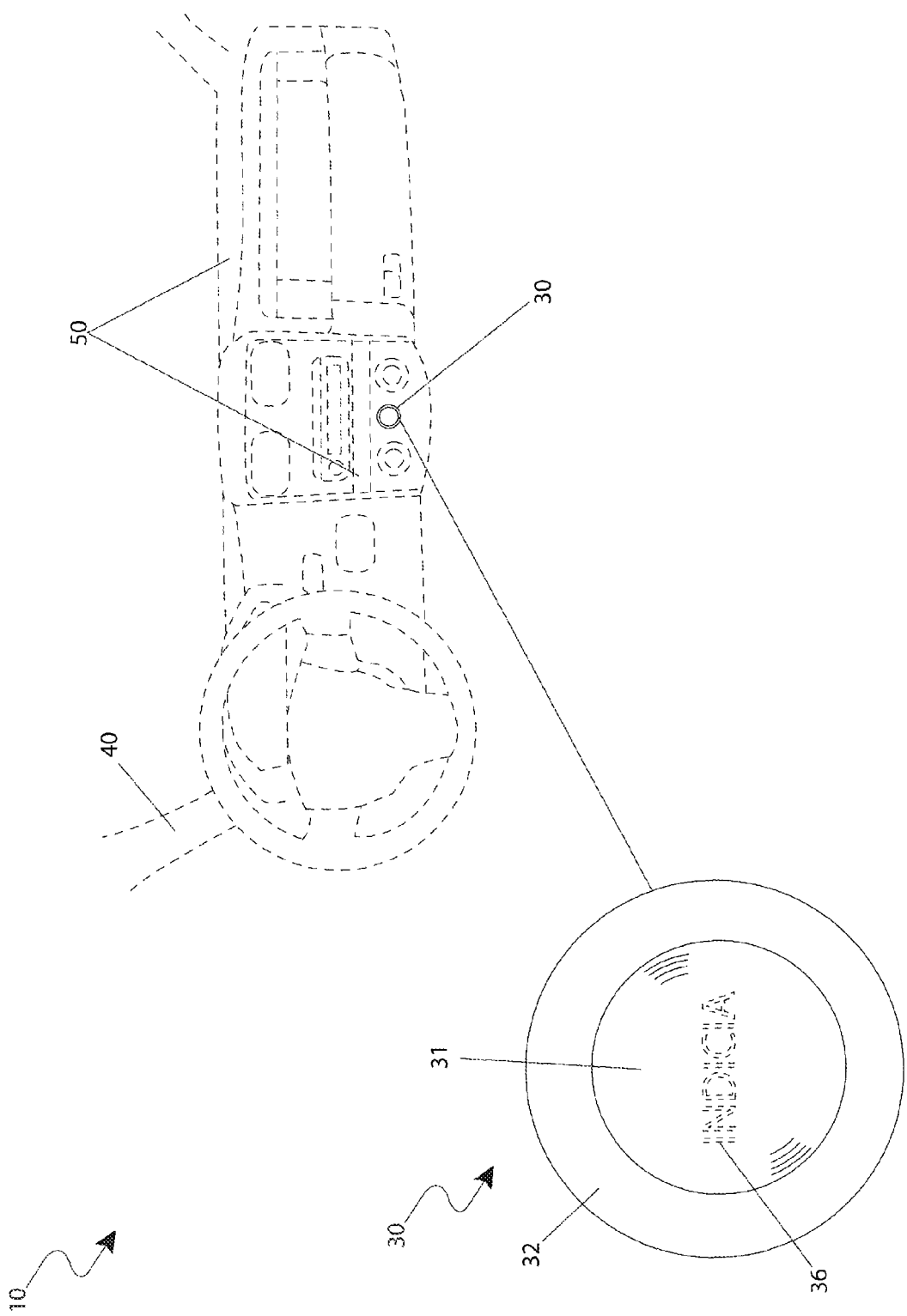
FIG. 4 is an environmental view of the tailgate status indicator 10 depicting an interior indicator 30, according to a preferred embodiment of the present invention.

The exterior housing 22 also comprises a sensor 26, thereby providing a signaling means thereto an interior indicator 30 (see FIG. 4). The sensor 26 is positioned in a way as to not interfere therewith the closing of the tailgate 44. The sensor 26 is preferably a common single-pole normally-closed (tailgate 44 open) momentary switch, yet other devices may be incorporated such as, but not limited to: proximity sensor, conductive sensors, or the like without limiting the scope of the system 10. The sensor 26 is interconnected via appropriately gauged electrical wiring 70 to an internal first battery 60 and a transmitter 79. The transmitter 79 transmits an RF signal 80 thereto a receiver 90 which is located within the interior indicator 30, thereby enabling communication from the exterior indicator 20 to the interior indicator 30.

Figure 8:
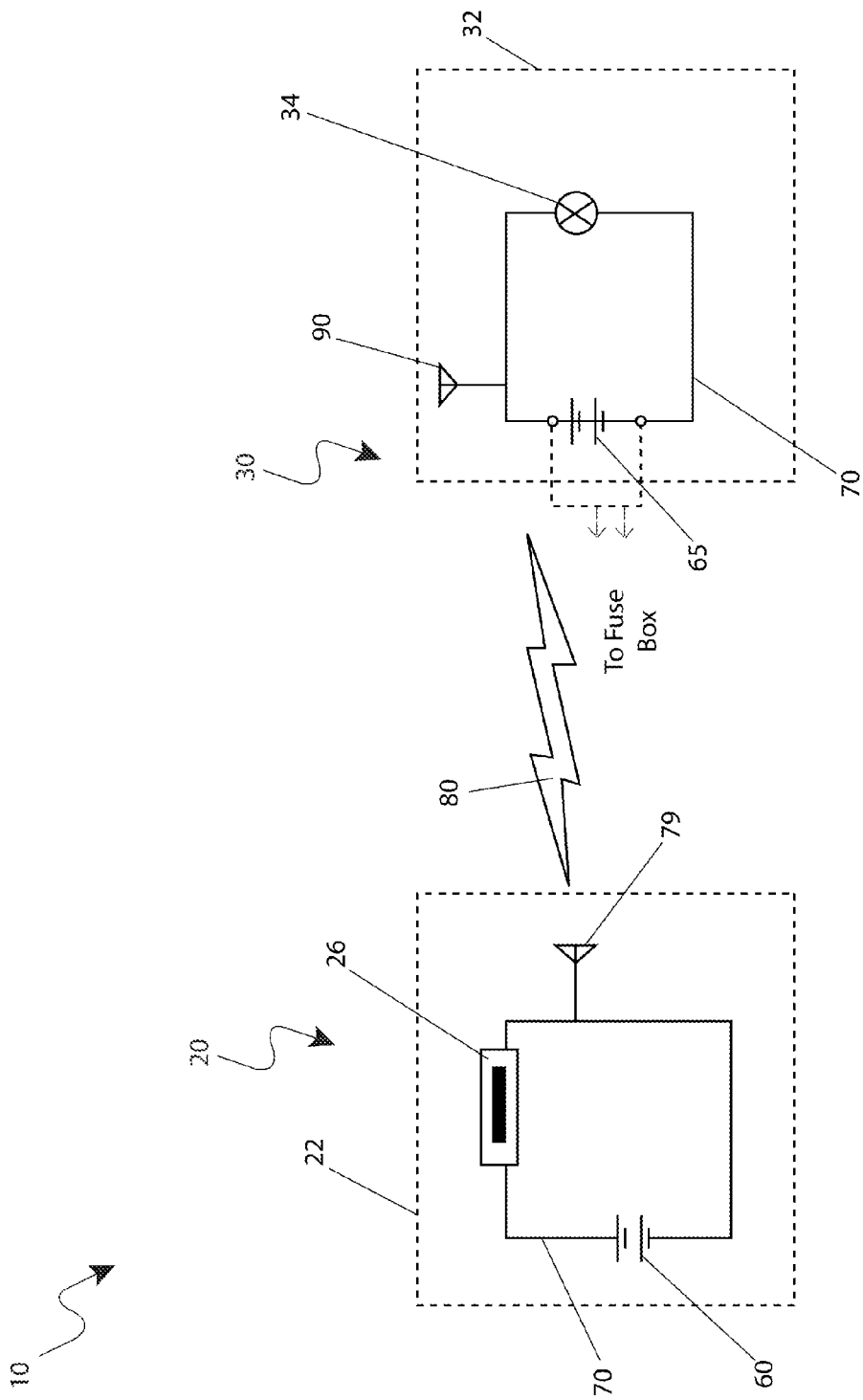

The exterior housing 22 yet further comprises a first battery 60, thereby providing a current to the sensor 26 and transmitter 79 therein said exterior housing 22 (also see FIG. 8). The first battery 60 is preferably a common user replaceable electrochemical cell, yet other devices may be utilized without limiting the scope of the system 10. The first battery 60 is accessed via a first battery compartment 61 located on a side surface of the exterior housing 22. The first battery compartment 61 enables the first battery 60 to be replaced as necessary. The first battery 60 is also secured within the exterior housing 22 via a first battery platform 62 which is integrally molded and protrudes from an interior surface of the exterior housing 22 and also provides an electrical connection means to the sensor 26 and the transmitter 79 in a conventional manner.

Referring now to FIG. 4, an environmental view of the system 10 depicting an interior placement, according to the preferred embodiment of the present invention, is disclosed. The system 10 comprises a dome-shaped interior indicator 30, thereby providing an illuminating warning signal thereto the operator informing them that the tailgate 44 is deployed. The interior indicator 30 is mounted and secured thereto a desired position on the dashboard 50 portion of the pickup truck 40 and is preferably hardwired into said dashboard 50 and interconnected to an existing accessory fuse box. This requires the user to retrofit and modify the dashboard 50 to fit the interior indicator 30. The interior indicator 30 may also be mounted therewith an alternate mount 38 via fasteners 49 (see FIG. 7) and a powered via a second battery 65. The interior indicator 30 is fabricated from a durable transparent plastic material in various colors.

Figure 5:
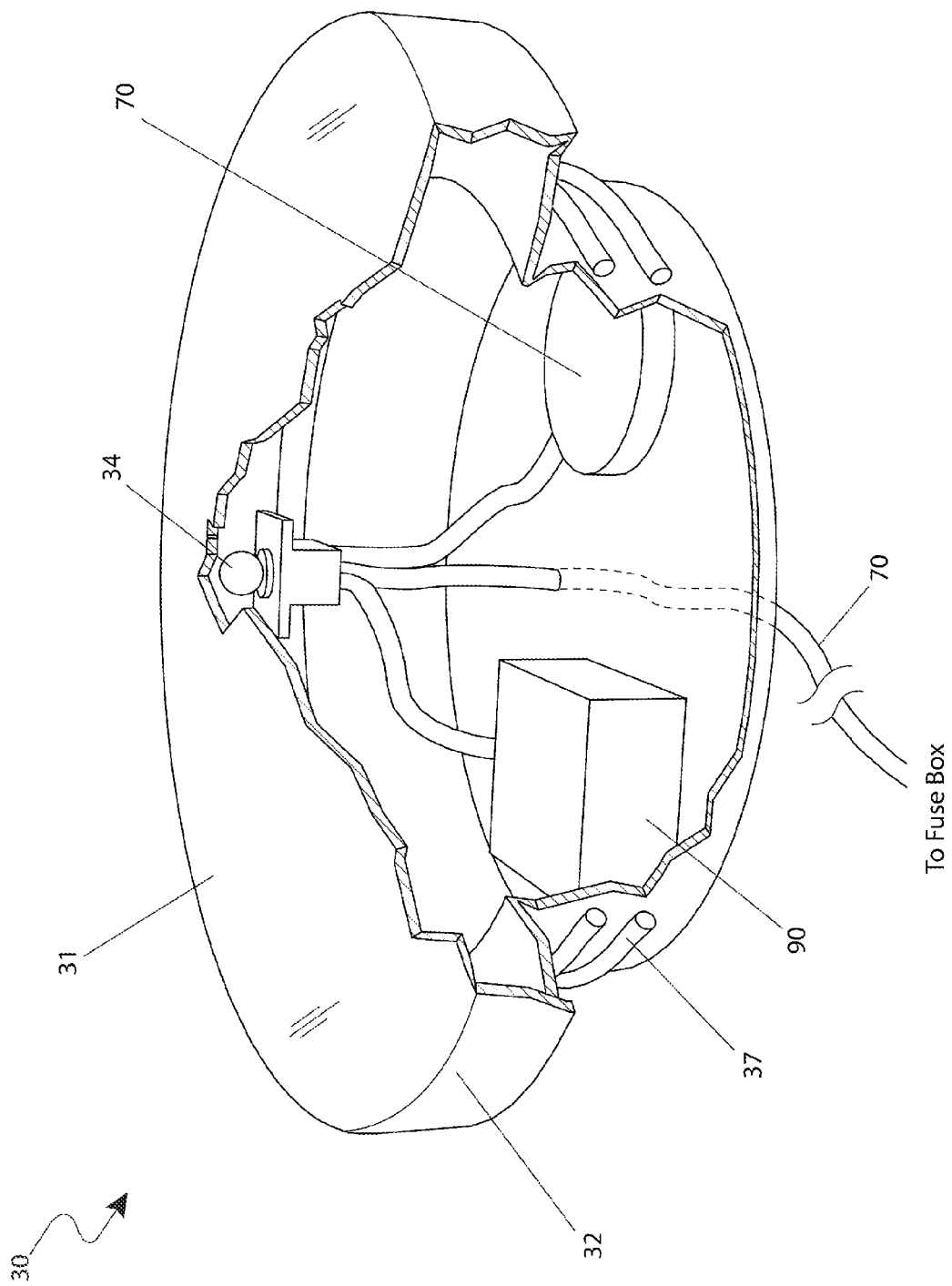
FIG. 5 is a side perspective view of the interior indicator 30, according to a preferred embodiment of the present invention.

Referring now to FIG. 5, a side perspective view of the interior indicator 30 and FIG. 6, a rear view of the interior indicator 30, according to the preferred embodiment of the present invention, are disclosed. The interior indicator 30 comprises an interior housing 32 having a circular cross-section further comprising a cover 31 and a threaded portion 37, thereby providing a secured embodiment for a lamp 34 and a mounting means to an alternate mount 38 (see FIG. 7), respectively. The cover 31 comprises indicia 36 which may provide script or images thereto warn the operator of a deployed tailgate 44. The indicia 36 may include script such as, but not limited to: "Warning," "Tailgate Ajar," or the like. The indicia 36 may also include images such as, but not limited to: warning symbols, pictures, and the like to further customize and personalize the system 10.

The lamp 34 illuminates the cover 31 indicating that the tailgate 44 is deployed. The lamp 34 is positioned at an intermediate location subjacent to the cover 31 and interconnected via wiring 70 to the second battery 65 and the receiver 90. The lamp 34 is preferably a light-emitting diode (LED); however, other illuminating devices may be provided without limiting the scope of the system 10.

The interior housing 32 further comprises a receiver 90 and a second battery 65 (see FIG. 8), thereby enabling signals to be received therefrom the transmitter 79 and supplying current to said receiver 90 and lamp 34, respectively. The second battery 65 is accessed from a rear surface of the interior indicator 30 via a second battery compartment 66 which enables to the operator to remove or replace said second battery 65 as desired. In use, if the interior indicator 30 is hard-wired to the pickup trucks 40 accessories fuse box, the second battery 65 would be removed, yet if not hard-wired the second battery 65 is placed within the second battery compartment 66, thereby powering the internal components.

Figure 7:
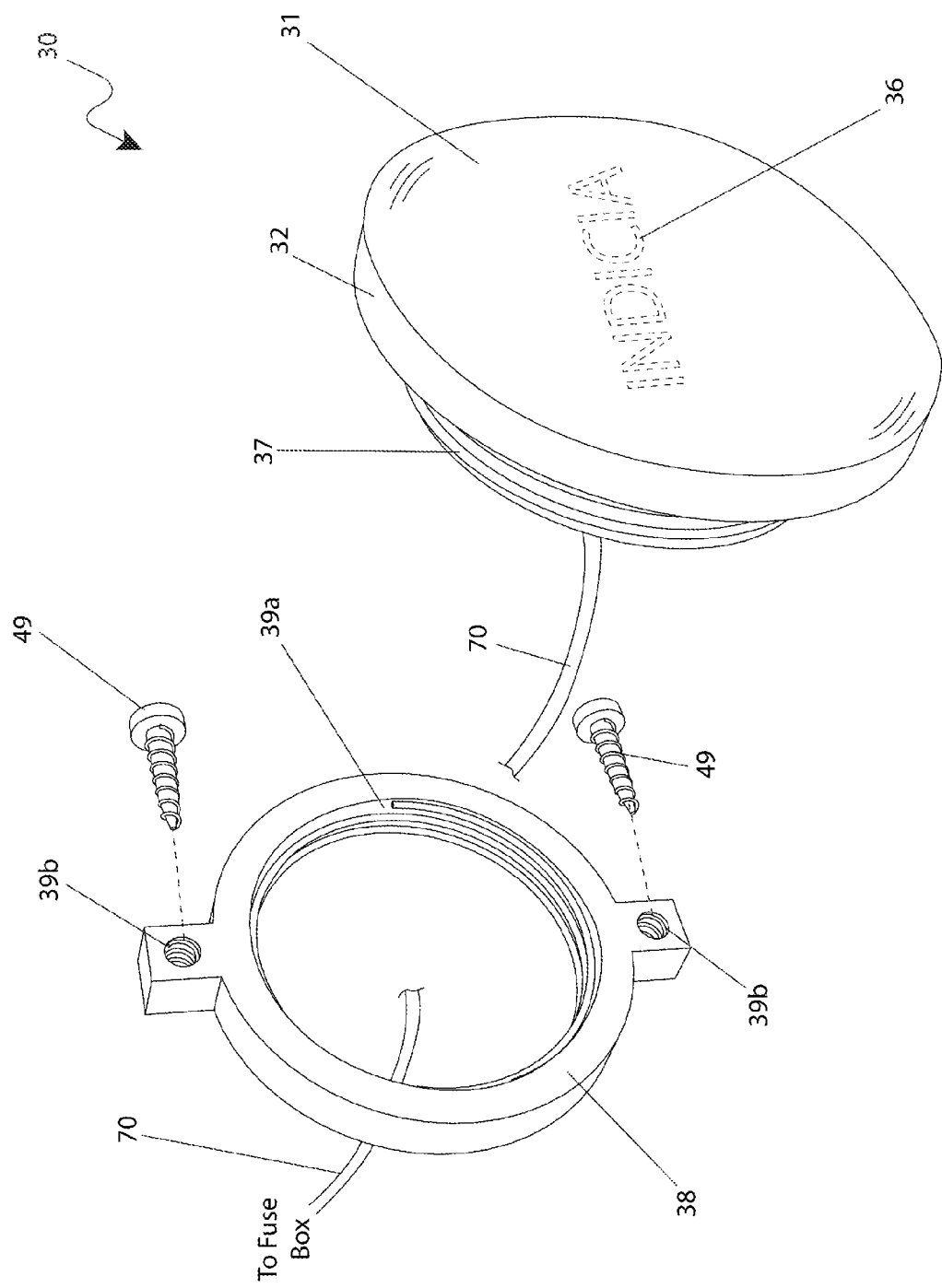
FIG. 7 is a perspective view of the interior indicator 30 depicting an alternate mount 38, according to an alternate embodiment of the present invention; and, FIG. 8 is an electrical block diagram of the tailgate status indicator 10, according to a preferred embodiment of the present invention.

Referring now to FIG. 7, perspective view of the interior indicator 30 depicting an alternate mount 38, according to an alternate embodiment of the present invention, is disclosed. The interior indicator 30 may be mounted to the dashboard 50 with an alternate mount 38, thereby enabling said interior indicator 30 to be fastened to a desired exterior surface of said dashboard 50 via fasteners 49. The alternate mount 50 comprises a circular body comprising an inner mount threaded portion 39a, thereby enabling the threaded portion 37 thereon the interior indicator 30 to engage said mount threaded portion 39a to secure the interior indicator 30 to the alternate mount 38. The alternate mount 38 is attached to the dashboard 50 via inserting a fastener 49 into a pair of mount apertures 39b and into said dashboard 50.

Referring now to FIG. 8, an electrical block diagram of the system 10, according to the preferred embodiment of the present invention, is disclosed. The exterior sensor 20 comprises a user replaceable first battery 60 thereto direct power thereto the sensor 26 and transmitter 79 via interconnected electrical wiring 70. The RF signal 80 from the transmitter 79 is received thereby the receiver 90 located therein the interior indicator 30. The interior indicator 30 receives power therefrom the existing fuse box therein the pickup truck 40 or other vehicle or a second battery 65 which is also interconnected to the receiver 90 and lamp 34 therewith electrical wiring 70. When the sensors 26 circuit is closed the RF signal 80 is transmitted to the receiver 90, thereby illuminating the lamp 34 and informing the user that the tailgate 44 is deployed.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1 through 6.

The method of utilizing the system 10 may be achieved by performing the following steps: acquiring the system 10; mounting the exterior housing 20 thereto the truck bed 42, thereby inserting fasteners 49 into each aperture 25 and ensuring that the tailgate 44 can be properly placed in its upward position; inserting a first battery 60 into the exterior housing 22 by way of the first battery compartment 61; mounting the interior indicator 30 thereto the dashboard 50 via retrofitting interior housing 32 to said dashboard 50; hard-wiring the interior indicator 30 to the existing fuse box or inserting a second battery 65 into said interior indicator 30 by way of the second battery compartment 66; enabling the sensor 26 thereto transmit the signal 80 thereto the interior indicator 30 when the tailgate 44 is deployed; securing the tailgate 44 when the interior indicator 30 illuminates; replacing the batteries 60, 65 as necessary; and, operating the pickup truck 40 as usual.

The alternate embodiment of the present invention can be utilized by the common user in a simple and effortless manner with little or no training. After initial purchase or acquisition of the system 10, it would be installed as indicated in FIG. 7.

The method of utilizing the system 10 may be achieved by performing the following steps: acquiring the system 10; mounting the exterior housing 20 thereto the truck bed 42, thereby inserting fasteners 49 into each aperture 25 and ensuring that the tailgate 44 can be properly placed in its upward position; inserting a first battery 60 into the exterior housing 22 by way of the first battery compartment 61; mounting the interior indicator 30 thereto the dashboard 50 via engaging the threaded portion 37 to the mount threaded portion 39a and inserting fasteners 49 into each mount aperture 39b and fastening to the exterior surface of the dashboard 50; hard-wiring the interior indicator 30 to the existing fuse box or inserting a second battery 65 into said interior indicator 30 by way of the second battery compartment 66; enabling the sensor 26 thereto transmit the signal 80 thereto the interior indicator 30 when the tailgate 44 is deployed; securing the tailgate 44 when the interior indicator 30 illuminates; replacing the batteries 60, 65 as necessary; and, operating the pickup truck 40 as usual.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An indicating device, comprising:
   a first indicator mounted adjacent to a tailgate of a vehicle, comprising:
      a "T"-shaped housing;
      a pair of mounting brackets extending outwardly from said "T"-shaped housing;
      a sensor located in a central position of said "T"-shaped housing, comprising a single-pole momentary switch;
      a transmitter; and,
      a power source in electrical communication with said sensor and said transmitter; and,
   a second indicator in electrical communication with said first indicator;
   wherein said indicating device provides a visual indicator for determining a positional state of a tailgate for an operator;
   wherein said sensor senses an opening of said tailgate and generates an opening signal transmitted by said transmitter to said second indicator; and,
   wherein said indicating device does not interfere with normal operation of said tailgate.

2. The indicating device of claim 1, wherein said electrical communication is a wireless communication.

3. The indicating device of claim 1, wherein said power supply further comprises a battery.

4. The indicating device of claim 1, wherein said second indicator further comprises:
   a dome-shaped housing;
   a mounting means for mounting said housing to said vehicle;
   a receiver housed within said housing of said second indicator;
   a visual indication means; and,
   a power supply in electrical communication with said receiver and said visual indication means;
   wherein said receiver receives said signaling means from said transmitter and activates said visual indication means; and,
   said visual indication means provides said visual indicator to said operator of said positional state of said tailgate.

5. The indicating device of claim 4, wherein said second indicator is mounted to a location on a dashboard of said vehicle.

6. The indicating device of claim 4, wherein said mounting means further comprises:
   electrical wiring connecting said power supply of said second indicator to an existing accessory fuse box of said vehicle; and,
   a threaded receiver located within said dashboard of said vehicle for receiving a corresponding threaded portion of said housing.

7. The indicating device of claim 6, wherein said mounting means further comprises a plurality of mounting apertures located on said housing of said second indicator each receiving a fastener for fastening said second indicator to said dashboard of said vehicle.

8. The indicating device of claim 4, wherein said power supply further comprises a battery.

9. The indicating device of claim 4, wherein said visual indicating means further comprises a lamp and a removable cover with indicia imprinted thereupon.

10. The indicating device of claim 4, wherein said visual indicating means further comprises a lamp and a removable cover with indicia imprinted thereupon.

11. A wireless indicating device for indicating a positional state of a tailgate of a vehicle, comprising:
    a first indicator mounted adjacent to said tailgate of said vehicle, further comprising:
       a first housing;
       a pair of mounting brackets outwardly extending from said first housing;
       a sensor located within a central position of said first housing generating a signaling means of said positional state of said tailgate, comprising a single-pole momentary switch;
       a transmitter for transmitting said signaling means; and,
       a first power source in electrical communication with said sensor and said transmitter; and,
    a second indicator in wireless communication with said first indicator, further comprising:
       a second housing;
       a mounting means for mounting said second housing to said vehicle;
       a receiver housed within said second housing for receiving said signaling means from said transmitter;
       a visual indication means activated by said receiver upon receipt of said signaling means; and,
       a second power supply in electrical communication with said receiver and said visual indication means;
    wherein said indicating device provides a visual indicator for determining a positional state of a tailgate for an operator; and,
    wherein said indicating device does not interfere with normal operation of said tailgate.

12. The indicating device of claim 11, wherein said first power supply further comprises a battery.

13. The indicating device of claim 11, wherein said second indicator is mounted to a location on a dashboard of said vehicle.

14. The indicating device of claim 11, wherein said mounting means further comprises:
    electrical wiring connecting said second power supply to an existing accessory fuse box of said vehicle; and,
    a threaded receiver located within said dashboard of said vehicle for receiving a corresponding threaded portion of said second housing.

15. The indicating device of claim 11, wherein said second power supply further comprises a battery.

16. The indicating device of claim 15, wherein said mounting means further comprises a plurality of mounting apertures located on said second housing each receiving a fastener for fastening said second indicator to said dashboard of said vehicle.

* * * * *